US010807322B2

(12) United States Patent
Marengo

(10) Patent No.: US 10,807,322 B2
(45) Date of Patent: Oct. 20, 2020

(54) METHOD OF MANUFACTURING A COMPOSITE COMPONENT

(71) Applicant: Rolls-Royce plc, London (GB)

(72) Inventor: Giovanni Antonio Marengo, Derby (GB)

(73) Assignee: Rolls-Royce plc, London (GB)

( * ) Notice: Subject to any disclaimer, the term of this patent is extended or adjusted under 35 U.S.C. 154(b) by 208 days.

(21) Appl. No.: 15/568,354

(22) PCT Filed: Apr. 25, 2016

(86) PCT No.: PCT/GB2016/051157
§ 371 (c)(1),
(2) Date: Oct. 20, 2017

(87) PCT Pub. No.: WO2016/174402
PCT Pub. Date: Nov. 3, 2016

(65) Prior Publication Data
US 2018/0147796 A1 May 31, 2018

(30) Foreign Application Priority Data
Apr. 30, 2015 (GB) .................................. 1507414.9

(51) Int. Cl.
*B29C 70/46* (2006.01)
*B29C 70/56* (2006.01)
(Continued)

(52) U.S. Cl.
CPC ............ *B29C 70/462* (2013.01); *B29C 70/56* (2013.01); *B29C 48/76* (2019.02); *B29L 2031/7504* (2013.01)

(58) Field of Classification Search
CPC .................................................. B29C 70/766
See application file for complete search history.

(56) References Cited

U.S. PATENT DOCUMENTS

| 5,348,602 A * | 9/1994 | Makarenko ............. B29C 70/44 |
| | | 156/160 |
| 8,999,096 B2 * | 4/2015 | De Mattia ............... B29C 53/04 |
| | | 156/222 |
| 2013/0266431 A1* | 10/2013 | Moram ................... B29C 53/04 |
| | | 415/182.1 |

FOREIGN PATENT DOCUMENTS

| CN | 103338914 A | 10/2013 |
| EP | 2514929 A2 | 10/2012 |
| (Continued) | | |

OTHER PUBLICATIONS

"Chinese Application Serial No. 2016800248841, First Office Action dated Apr. 3, 2019", w/ English Translation, 17 pgs.
(Continued)

*Primary Examiner* — Matthew J Daniels
*Assistant Examiner* — Hana C Page
(74) *Attorney, Agent, or Firm* — Schwegman Lundberg & Woessner, P.A.

(57) ABSTRACT

There is disclosed a method of manufacturing a composite component comprising a main body and an integral flange, the method comprising: applying fibre reinforcement material on a tool having a main body portion and a flange-forming portion to provide a pre-form having first, second and third contiguous regions, the first region corresponding to the main body of the component and the second region corresponding to the integral flange of the component; and causing relative movement between the flange-forming portion and the main body portion so that the second region of the pre-form deforms to form the flange; wherein the relative movement of the flange-forming portion and the main body portion causes sliding movement between the second and third regions of the pre-form and the flange-forming, thereby producing a tension force in at least the second region of the pre-form during forming of the flange.

13 Claims, 6 Drawing Sheets

Figure 1:
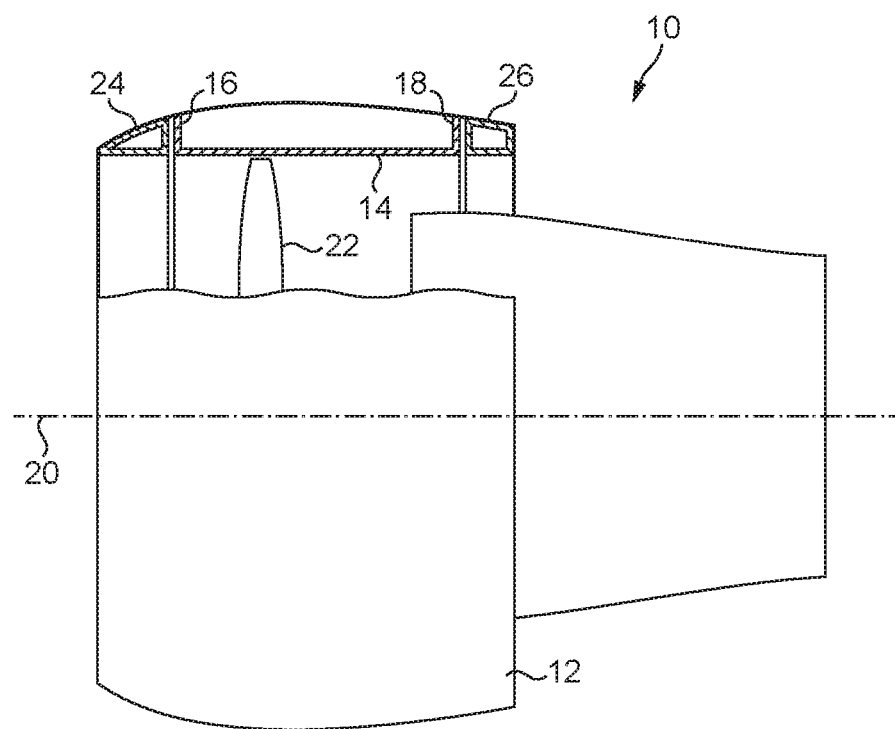

(51) Int. Cl.
*B29C 48/76* (2019.01)
*B29L 31/00* (2006.01)

(56) References Cited

FOREIGN PATENT DOCUMENTS

| | | |
|---|---|---|
| GB | 2198387 A | 6/1988 |
| GB | 2243104 A | 10/1991 |
| GB | 2486231 A | 6/2012 |
| WO | WO-2014050422 A1 | 4/2014 |

OTHER PUBLICATIONS

International Patent Application No. PCT/GB2016/051157, International Search Report and Written Opinion dated Jul. 4, 2016, 11 pgs.
United Kingdom Patent Application No. 1507414.9, Search Report dated Oct. 26, 2015, 4 pgs.
Japanese Application Serial No. 2017-556717, Non Final Office Action dated Nov. 26, 2019, w/ English Translation, 9 pgs.

\* cited by examiner

METHOD OF MANUFACTURING A COMPOSITE COMPONENT

This application is a U.S. National Stage Filing under 35 U.S.C. 371 from International Application No. PCT/GB2016/051157, filed on Apr. 25, 2016, and published as WO 2016/174402 A1 on Nov. 3, 2016, which claims the benefit of priority under 35 U.S.C. § 119 to United Kingdom Patent Application No. 1507414.9, filed on Apr. 30, 2015, each of which is hereby incorporated by reference herein in its entirety.

The invention relates to a method of manufacturing a composite component having a main body and an integral flange, in particular, although not exclusively, an annular composite component.

Composite materials are increasingly used for components that require particular combinations of material properties. In particular, composite materials such as Carbon Fibre Reinforced Polymer (CFRP) are commonly used for components in the aerospace and other industries due to their high stiffness and low weight.

It is frequently desirable to manufacture a component with a flange, such as an annular flange on a casing for a gas turbine, or the sides of a spar for a wing. Where such components are to be manufactured from composite materials, the formation of the flange can pose an engineering problem. For example, it may be difficult to lay-up composite material on a flanged mould, in particular in the region of bends between the main portion of the mould and the flange that may be hard to access.

One known method of manufacturing a composite component with an integral flange is disclosed in GB2486231, which discloses an annular mould for a composite pre-form having a first portion and a movable second portion. After laying up plies of unidirectional composite tape on the mould, the mould and pre-form are heated in an autoclave and the movable second portion is actuated to move radially outward, thereby deforming an end region of the pre-form overlaying the movable second portion of the tool to form the flange.

In GB2486231, the flange abruptly extends away from the cylindrical region of the pre-form so that the cross-section of a transition region between them appears relatively square. In other words, there is a high curvature bend between the cylindrical region and the flange. In GB2486231, the shape of the transition region is defined in part by a counteracting forming tool (or female forming tool) having a high curvature edge about which the flange is formed.

It is frequently desirable to manufacture a composite component in which there is a low curvature transition between a main region of the component and a flange. For example, a low curvature transition may reduce stress concentrations and improve the structural characteristics of the component. Where a flanged mould is used, the low curvature transition region can be defined on the mould. However, where a tool with a movable portion is used to form the flange, the low curvature transition region cannot be pre-defined on the lay-up surfaces of the tool, as the lay-up surfaces are substantially continuous in a lay-up configuration. Whilst a counteracting forming tool portion may be provided to define the profile of the transition region on an outer side of the pre-form, the applicant has found that the transition region of the formed component may not conform to the desired shape or may suffer from forming defects in this region, such as the formation of out-of-plane wrinkles in the alignment, and ply misalignment.

It is therefore desirable to provide an improved method of manufacturing a composite component.

According to a first aspect of the invention there is provided a method of manufacturing a composite component comprising a main body and an integral flange, the method comprising: applying fibre reinforcement material on a tool having a main body portion and a flange-forming portion to provide a pre-form having first, second and third contiguous regions, the first region corresponding to the main body of the component and the second region corresponding to the integral flange of the component; and causing relative movement between the flange-forming portion and the main body portion so that the second region of the pre-form deforms to form the flange; wherein the relative movement of the flange-forming portion and the main body portion causes sliding movement between the second and third regions of the pre-form and the flange-forming, thereby producing a tension force in at least the second region of the pre-form during forming of the flange.

The method may further comprise separating a part of the composite material formed on the tool after the forming operation including material corresponding to the third region of the pre-form. The separated part of the composite material may be separated by cutting, and may then be discarded or recycled. Further, the separated part of the material may include material corresponding to a part of the second region of the pre-form adjacent the third region of the pre-form, so as to achieve the desired size and shape of the flange.

The thickness of the third region of the pre-form may be less than the thickness of the second region of the pre-form. The third region of the pre-form may comprise fewer layers of fibre reinforcement material than the second region of the pre-form. The thickness of the third region of the pre-form may be 50% or less of the thickness of the second region of the pre-form. The thickness of the third region of the pre-form may be 90% or less, 80% or less, 70% or less, 60% or less, 40% or less, 30% or less, 20% or less, 10% or less, or 5% or less of the thickness of the second region of the pre-form.

The number of layers in the third region of the pre-form may be 50% or less than the number of layers. The number of layers in the third region of the pre-form may be 90% or less, 80% or less, 70% or less, 60% or less, 40% or less, 30% or less, 20% or less, 10% or less, or 5% or less of the number of layers in the second region of the pre-form.

The fibre reinforcement material may be applied on the tool so that the thickness of the second region of the pre-form is substantially constant, and so that the thickness of the third region of the pre-form is substantially constant. The thickness of the first region of the pre-form may be substantially constant and may be equal to the thickness of the second region.

The number of layers of fibre reinforcement material in the second region of the pre-form may be substantially constant throughout the second region of the pre-form, and the number of layers of fibre reinforcement material in the third region of the pre-form may be substantially constant through the third region of the pre-form. The number of layers of fibre reinforcement material in the first region of the pre-form may be substantially constant throughout the first region of the pre-form. There may be an equal number of layers in the first and second regions of the pre-form.

The pre-form may comprise a base-ply set of fibre reinforcement material extending through at least the second and third regions of the pre-form, and an upper-ply set extending through at least the second region but not the third region of the pre-form. The base-ply set may comprise at least one layer of fibre reinforcement material, and the upper-ply set may comprise a plurality of layers of fibre-reinforcement material. The base-ply set may comprise a plurality of layers of fibre reinforcement material. The base-ply set may be in contact with the surface of the tool.

The method may further comprise inhibiting sliding movement between the first region of the pre-form and the main body portion of the tool. The method may comprise positioning a counteracting flange-support structure against the pre-form prior to the forming operation so that the pre-form is disposed between the flange-support structure and the first and/or second portion of the tool, and so that the flange is formed against the flange-support structure during the forming operation. The flange support structure may be positioned so that sliding movement between the second region of the pre-form extending over the second portion of the tool and the second portion of the tool is inhibited or prevented.

The fibre reinforcement material may be applied on the tool so that the third region of the pre-form has an area of at least 25% of the area of the second region of the pre-form. The area of the third region of the pre-form may be at least 10%, at least 50%, at least 75%, at least 100% or at least 150% of the area of the second region of the pre-form.

The fibre reinforcement material may be applied so that the first, second and third regions are contiguous along a generally longitudinal direction, and the third region of the pre-form may have a longitudinal extent of at least 25% of the longitudinal extent of the second region of the pre-form. The third region of the pre-form may have a longitudinal extent of at least 10%, at least 50%, at least 75%, at least 100% or at least 150% of the longitudinal extent of the second region of the pre-form.

The flange-forming portion of the tool may have a lay-up surface that is substantially continuous with a lay-up surface of the main body portion of the tool in a lay-up configuration of the tool, and a side surface which extends between the lay-up surfaces of the flange-forming portion and main body portion of the tool in a forming configuration of the tool.

The tool may move between the lay-up configuration and the forming configuration by relative movement of the flange-forming portion and the main body portion of the tool. The direction of relative movement of the flange-forming portion and the main body portion of the tool may be parallel to the extent of the flange.

The composite component may be an annular or a partially annular component, such as a casing for a gas turbine engine. The main body portion and the flange-forming portions of the tool may be configured for relative radial movement, and the flange may be a radial flange.

According to a second aspect of the invention there is provided a pre-form for a composite component having a main body and an integral flange, the pre-form comprising: first, second and third contiguous regions, the first region corresponding to the main body of the component and the second region corresponding to the integral flange of the component; wherein the pre-form is provided on a tool having a main body portion and a flange-forming portion; wherein the pre-form is configured so that, during a forming operation in which there is relative movement between the flange-forming portion and the main body portion, the second region of the pre-form deforms to form the flange; and wherein the pre-form is configured so that the relative movement of the flange-forming portion and the main body portion causes sliding movement between the second and third regions of the pre-form and the flange-forming portion, thereby producing a tension force in at least the second region of the pre-form during forming of the flange.

Figure 2:
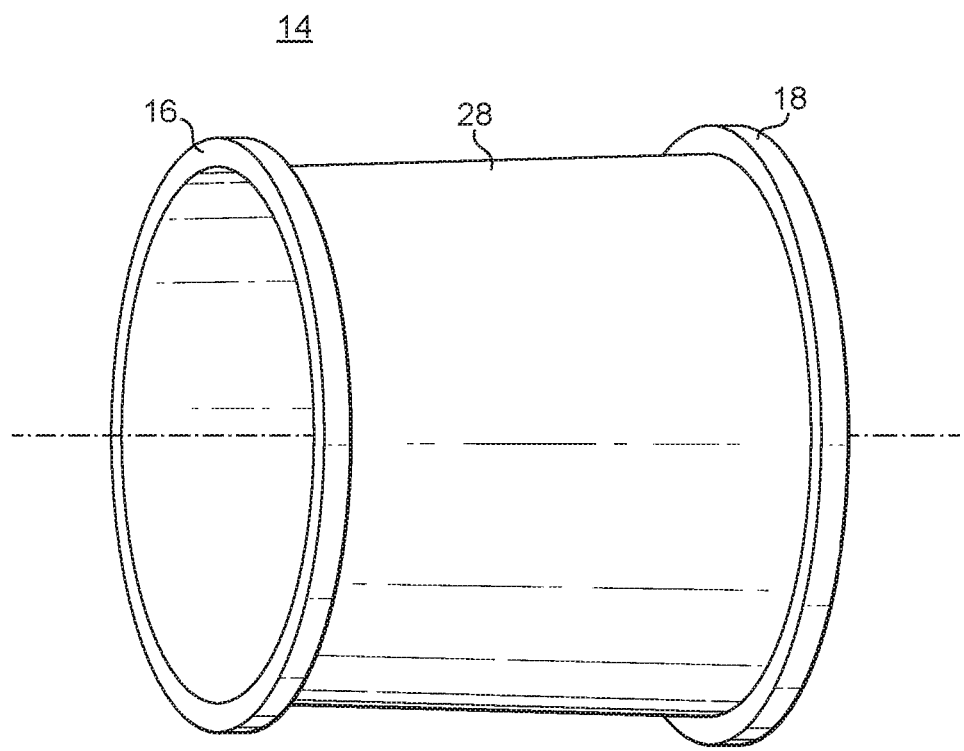
Figure 3:
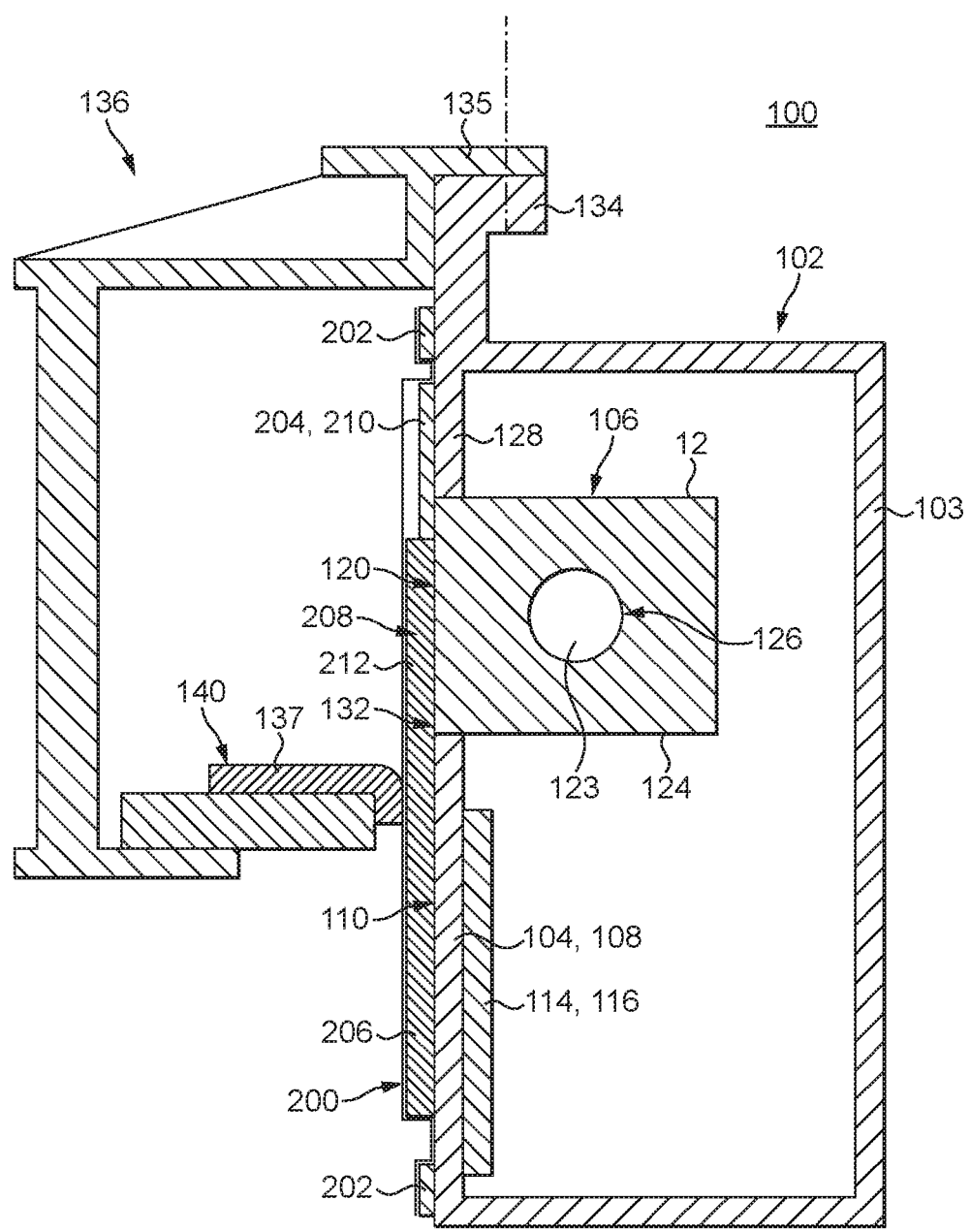
Figure 4:
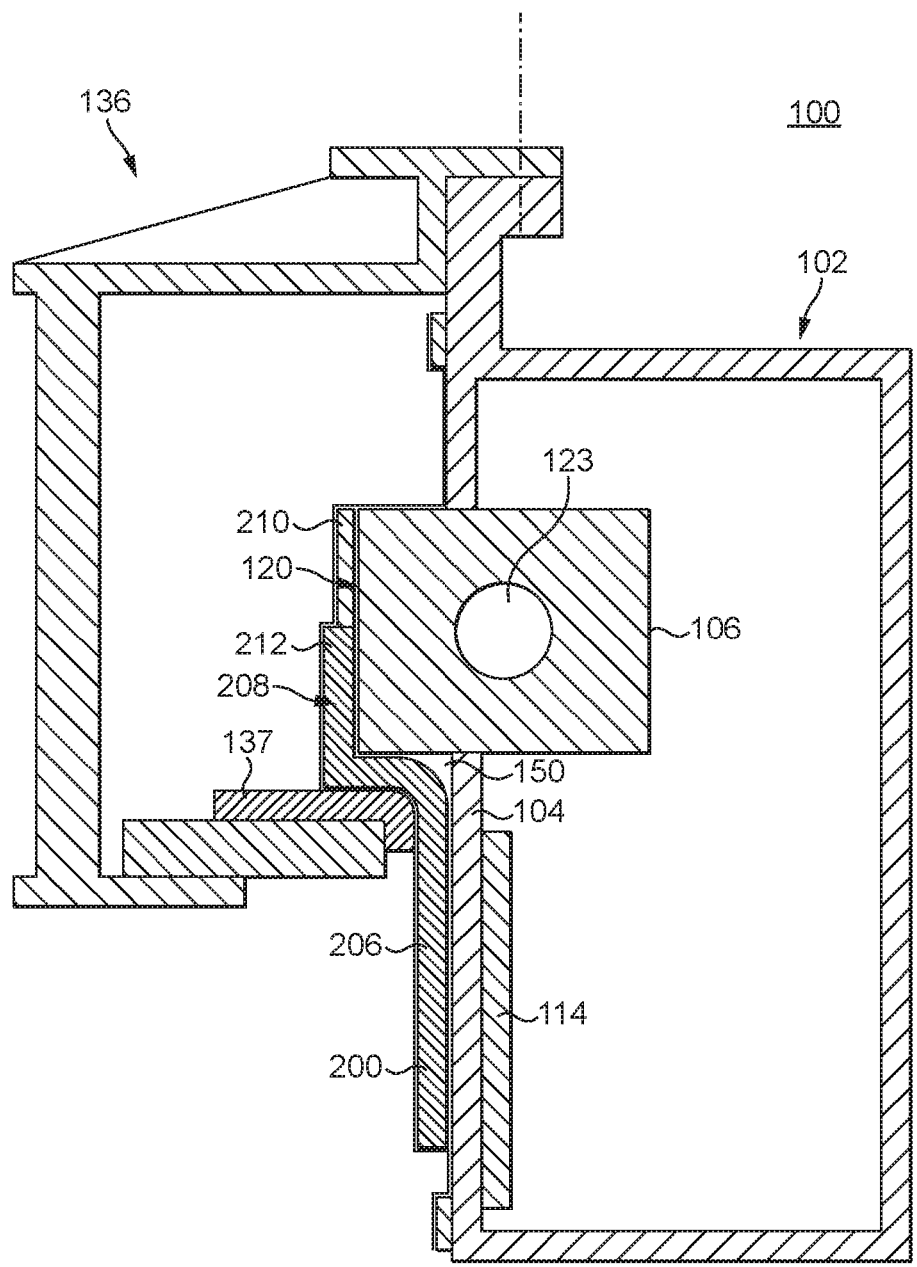
Figure 5:
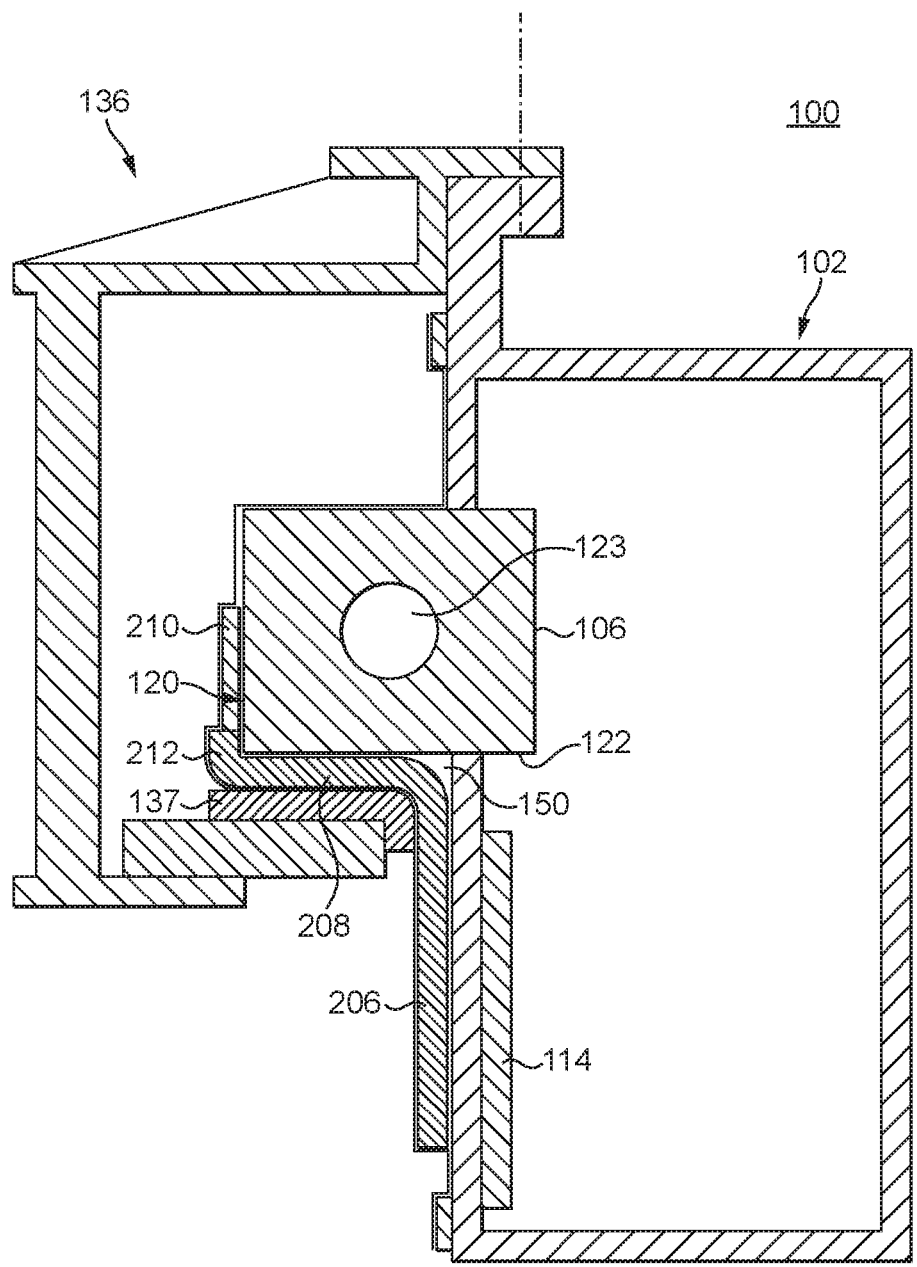
Figure 6:
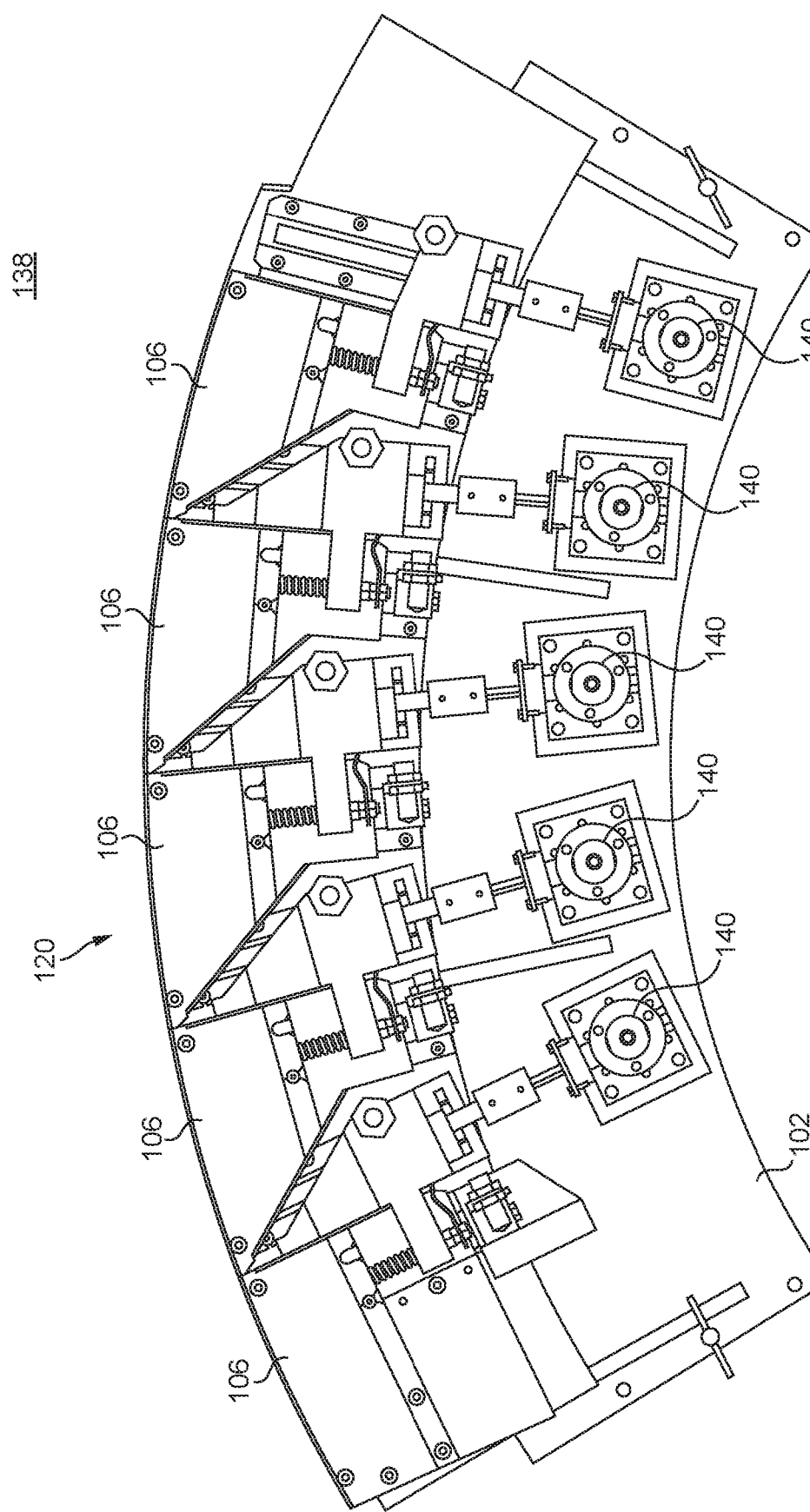
Figure 7:
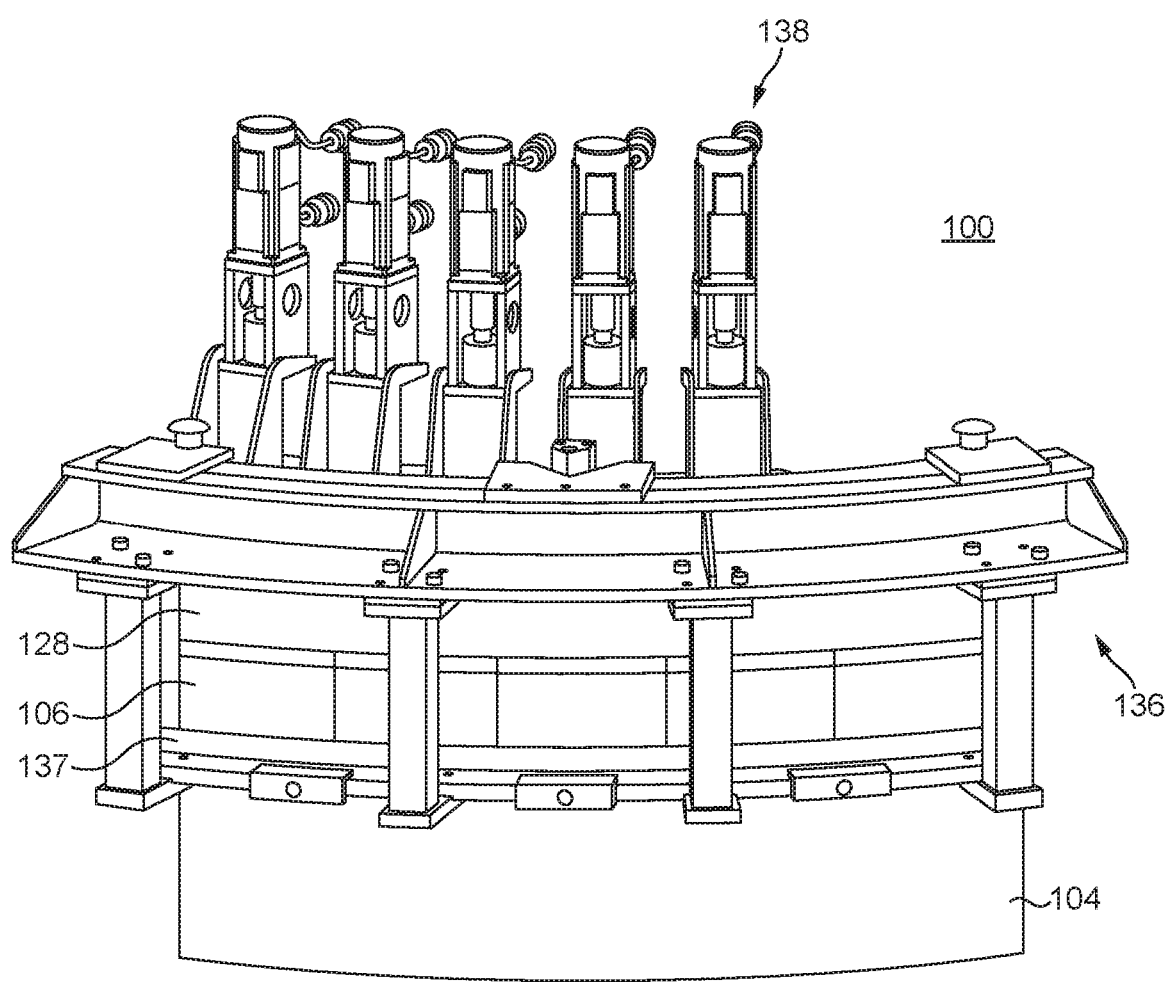

The invention will now be described, by way of example, with reference to the following drawings, in which:

FIG. 1 schematically shows a cutaway view of a gas turbine engine;

FIG. 2 schematically shows the casing of the gas turbine engine of FIG. 1;

FIG. 3 schematically shows a partial cross-sectional view of an apparatus for manufacturing a composite component, in which a movable flange-forming portion of the apparatus is shown in a lay-up configuration;

FIG. 4 schematically shows a partial cross-sectional view of the apparatus of FIG. 3 in which the movable flange-forming portion has moved relative a main body portion of the apparatus;

FIG. 5 schematically shows a partial cross-sectional view the apparatus of FIGS. 3 and 4 in which the movable flange-forming portion is in a flange-forming configuration;

FIG. 6 schematically shows actuation mechanisms for a plurality of flange-forming portions; and FIG. 7 schematically shows the apparatus of FIGS. 3-6 in perspective view.

FIG. 1 shows a gas turbine engine 10 comprising an exterior nacelle 12 supported on an annular casing 14 having forward and aft flanges 16, 18. The casing 14 is centred on the axis 20 of the engine 10 and houses a fan 22 comprising a plurality of fan blades. Forward and aft annular casing boxes 24, 26 support the front and rear portions of the nacelle 12.

As shown in FIG. 2, the casing 14 has a curved main body 28 which is generally cylindrical and is provided with forward and aft flanges 16, 18 extending radially outwardly with respect to the curvature of the main body.

The casing 14 is composed of composite material, such as Carbon Fibre Reinforced Polymer (CFRP). In particular, the casing 14 comprises a plurality of plies of pre-impregnated ("pre-preg") unidirectional composite tape that been have been applied to a mould in a lay-up process and cured.

FIGS. 3 to 5 show cross sectional views of an apparatus 100 for manufacturing the composite casing 14.

The apparatus 100 comprises a generally annular tool 102 that is configured to rest on a horizontal surface, such as a workshop floor, so that its central axis (not shown) extends vertically, although in other embodiments it may be supported in any orientation. The tool 102 comprises an annular support structure 103 for supporting a plurality of angularly spaced flange-forming portions 106 and a body portion 104.

The body portion 104 comprises a plurality of circumferentially extending curved body panels 108 that together define a cylindrical lay-up surface 110 for a composite pre-form 200. In this embodiment, there are six curved body panels 108 each having an angular extent of 60°. The body portion 104 is provided with a body heater 114 comprising a plurality of heater mats 116 mounted to the radially inner surfaces of the curved body panels 108 for heating the body panels 108, and thereby a pre-form 200 disposed on the outer lay-up surface 110 of the body portion 104. In this example, the body panels 108 are composed of a thermally conductive metal, in particular, stainless steel or aluminium.

The flange-forming portions 106 are mounted to the support structure 103 above the body portion 104 by an actuation mechanism (not shown) and are radially movable with respect to the support structure 103 and the body portion 104 between a lay-up configuration (FIG. 3) and a forming configuration (FIG. 5). Each flange-forming portion 106 has a circumferentially extending radially outer lay-up surface 120 which is configured to be contiguous and continuous with the lay-up surface 110 of the adjacent body portion 104 in the lay-up configuration, and which is disposed radially outward of the body portion 104 in the forming configuration.

In this example, each flange-forming portion 106 is in the form of a semi-annular block that defines the radially outer lay-up surface 120 and has four radially extending sides: lower and upper side surfaces 122, 124 and angularly spaced side surfaces (not shown). The lower side surface 122 acts as a flange-forming surface during a forming operation, as will be described in detail below. In this embodiment, each flange-forming portion 106 has an angular extent of 12°, and so the tool 102 comprises 30 separate flange-forming portions.

Each flange-forming portion 106 comprises a cavity 126 in which there is disposed a flange heater 123 for heating the flange-forming portion 106. Each flange-forming portion 106 is composed of a thermally conductive metal, in particular, stainless steel or aluminium.

The flange heaters 123 and the body heater 114 are coupled to a controller (not shown) for controlling flange forming and curing operations, as will be described below. Similarly, the actuators (not shown) for the flange-forming portions 106 are coupled to the controller for controlling their movement in a flange forming operation.

The tool 102 further comprises a generally cylindrical continuation portion 128 disposed above the flange-forming portions 106 and having a radially outer lay-up surface 130 arranged to be contiguous and continuous with the lay-up surfaces 120 of the flange-forming portions 106 when they are in the lay-up configuration. The continuation portion 128 is supported on the support structure 103 and comprises a plurality of continuation panels 131.

The lay-up surfaces 110, 120, 130 of the body portion 104, flange forming portions 106 and the continuation portion 128 of the tool 102 together define a generally cylindrical continuous lay-up surface 132 for laying up a cylindrical pre-form 200.

The tool 102 further comprises a plurality of attachment portions 134 angularly spaced around the circumferential extent of the tool 102 above the continuation portion 128 for coupling with a flange support structure 136. The flange support structure 136 is in the form of an annular frame configured to extend around a pre-form 200 disposed on the lay-up surface 132 of the tool and is detachably attachable to the tool 102 by cooperating attachment portions 134, 135 on the tool 102 and the flange support structure 136 respectively. For example, the attachment portions 134, 135 may be coupled by bolts.

The flange support structure 136 comprises a counteracting flange support portion 137 arranged to counteract the flange-forming surfaces of the flange-forming portions 106 of the tool 102 during a flange forming operation to control the shape of the formed flange. In particular, the counteracting flange support portion 137 is arranged to abut a pre-form 200 disposed on the lay-up surface of the tool and defines an annular counteracting forming surface 140 for shaping the underside of the flange during a forming operation. The counteracting forming surface 140 is substantially horizontal and positioned below the level of the lower surfaces 122 of the flange-forming portions 106 of the tool 102 by a distance corresponding to the desired thickness of the flange and has a radially inner rounded bend or transition portion for forming a bend or transition region in the flange where the main body and flange of the component meet. In this embodiment, the transition portion has a relatively low curvature so that there is a continuous bend between the main body and flange of the composite component. In particular, in this embodiment the flange-forming portion is arranged to form a flange having a radial extent of approximately 65 mm, and the radius of curvature for the flange is approximately 10 mm.

The flange support structure 136 also comprises an integral mounting and heating element by which the counteracting flange support portion 137 is mounted and heated for forming and curing.

FIG. 6 shows a portion of the actuation mechanism 138 corresponding to five of the flange-forming portions 106. For each flange-forming portion 106, the actuation mechanism comprises a linear motor 140 mounted to the tool 102 and coupled to the controller for controlling the linear radial movement of the flange-forming portion 106 between the lay-up and forming configurations.

FIG. 7 shows a portion of the apparatus 100 corresponding to one sixth of the full annulus and in particular shows the arrangement of the tool 102 including the body portion 104, five movable flange-forming portions 106, the continuation portion 128, together with the flange support structure 136 and a portion of the actuation mechanism 138 corresponding to the five flange-forming portions 106 shown.

A method of manufacturing a composite component using the apparatus 100 will now be described, by way of example.

The apparatus 100 is oriented on a support surface, such as a floor, so that its central axis extends vertically. The apparatus 100 is prepared for a lay-up operation by detaching the flange support structure 132, if attached, and by controlling the actuation mechanism 138 to return the plurality of flange-forming portions 106 to the lay-up configuration. Accordingly, a continuous lay-up surface 132 is defined on the tool 102 by the radially outer surfaces of the body portion 104, the plurality of flange-forming portions 106 and the continuation portion 128 and is accessible from a radially outer position.

A lay-up operation is conducted in which unidirectional tapes of pre-impregnated composite material are applied to the continuous lay-up surface 132 in successive layers or plies using an automatic tape laying (ATL) apparatus, thereby forming a substantially cylindrical composite pre-form 200 on the tool 102. In this embodiment, the tapes are applied in a combination of ±60° and 90° (i.e. vertical) orientations with respect to a plane normal to the axis of the tool, and extend over the lay-up surfaces 110, 120, 130 of the body portion 104, flange-forming portions 106 and the continuation portion 128 respectively. In other embodiments, other layup techniques may be used, such as AFP (Automatic Fibre Placement), or hand lay-up.

The composite material is applied to the tool to provide a pre-form having three contiguous regions: a first region 206 corresponding to the main body of the composite and disposed over the layup surface 110 of the main body portion of the tool 104; a second region 208 corresponding to the flange of the component and extending part-way over the lay-up surface 120 of the flange-forming portion of the tool 106, and a third region 210 that extends from the second region over the lay-up surfaces 120, 130 of the flange-forming portion 106 and continuation portion 128 of the tool. In other embodiments, the second region 208 may extend over the entire lay-up surface 120 of the flange-forming portion and/or over the lay-up surface 130 of the continuation portion 128 of the tool.

In this embodiment, the composite material is applied to the tool to provide a pre-form for a casing for a gas turbine having an axial length of 1000 mm and a flange radius of 65 mm (with a radius of curvature of 10 mm). The composite material is applied to the tool so that the first region 206 has an axial extent over the main body portion 104 of 1000 mm, the second region 208 has an axial extent over the flange-forming portion of the tool 106 of 65 mm, and the third region 210 has an axial extent over the flange-forming and continuation portions of the tool 106, 128 of approximately 65 mm. In this embodiment, the area and longitudinal extent of the third region of the pre-form 210 is substantially equal to that of the of the second region 208 corresponding to the flange of the component. In other embodiments, the area and/or longitudinal extent of the third region of the pre-form 210 may be greater than equal (for example at least 150%) or less than equal (for example at least 10%) to the area and/or longitudinal extent of the second region 208.

The lay-up procedure is controlled so that there the first and second regions 206, 208 have a greater number of layers of composite material than the third region 210, so that the thickness of the third region 210 is less than the thickness of the first and second regions 206, 208. In particular, in this embodiment, there are 10 layers of composite material extending through the first and second regions 206, 208 (a base layer and nine upper layers), and 2 layers of composite material extending through the third region (a base layer and a single upper layer). In other words, there is a base-ply set of 2 layers of fibre reinforcement material, and an upper-ply set of 8 layers of fibre reinforcement material. The third region 210 comprises only layers of the base-ply set. In other embodiments, there may be only a single layer in the base-ply set (i.e. in the third region 210), or there may be more than two layers. In yet further embodiments, there may be an equal number of layers in the second and third regions 208, 210, and they may be of substantially equal thickness.

In this embodiment, the base-ply set is approximately 10 mm thick and the upper-ply set is approximately 30 mm thick.

Once the lay-up operation is complete, adhesive tapes 202 are applied in annular loops to the body portion 104 and continuation portion 128 below and above the pre-form 200 respectively, and a vacuum bag 204 is placed over the pre-form 200 and sealed with the tapes 202 against the tool 102.

Vacuum tubes (not shown) are extended through the vacuum bag to the space enclosed between the tool 102 and the vacuum bag 204, and a vacuum source such as a vacuum pump is applied to the vacuum tubes to create a partial vacuum in the space occupied by the pre-form 200. In this example, a partial vacuum is formed so that an unbalanced pressure force from the ambient atmosphere is applied through the vacuum bag onto the pre-form 200.

The forming operation is initiated by the controller causing the heating apparatus (i.e. the body heater 114 and flange heaters 123) to heat the pre-form 200 to a threshold forming temperature, which in this example is 80° C.

When the pre-form 200 has reached the threshold forming temperature, the controller causes the actuation mechanism 138 to drive the flange-forming portions 106 radially outwardly from the lay-up configuration to the forming configuration (FIGS. 3-5). As the flange-forming portions 106 move radially outwardly, the second and third regions 208, 210 of the pre-form are caused to slide over the flange-forming portion. The movement of the flange-forming portions 106 causes the second region 208 to plastically deform around and between the underside surface 122 of the flange-forming portion 106 and the counteracting flange support portion 137 to form the radial flange of the component. In contrast, the first region 206 of the pre-form remains substantially in place against the body portion 104 of the tool 100, except for a transition region of the pre-form where the first and second regions 206, 208 meet, which is pulled towards the counteracting flange support portion 137 (as shown in FIGS. 4 and 5). The flange-forming portions 106 are configured to move slowly during the forming operation, such as at approximately 120 mm per hour, to ensure that the layers of the composite pre-form 200 are able to move relative one another during the forming operation without creating wrinkles in the second region of the pre-form.

The sliding movement of the first and second regions of the pre-form 208, 210 is resisted by friction or shear viscous forces acting between the base layer (base-ply set) in these regions and the lay-up surfaces 120, 130 of the flange-forming portions 106 and the continuation portion 128. The shear viscous forces are proportional to the area of the second and third regions 208, 210 that slide over the lay-up surfaces 120, 130. The shear viscous forces act on second and third regions of the pre-from 208, 210 in a direction extending away from the first region 206 of the pre-form, so as to apply tension to the pre-form 200.

The tension in the pre-form has the effect that the pre-form is drawn against the curved transition portion of the counteracting flange support portion 137, and therefore closely conforms to the transition portion. In the absence of significant tension in the pre-form, the pre-form may expand into a void 150 formed between the counteracting flange support portion 137 and the junction of the flange-forming portion 106 and the body portion 104 of the tool 100 (see FIGS. 4 and 5). This may be particularly problematic for larger voids caused by a low curvature transition region, or where other forces may act to draw the pre-form 200 away from the curved transition portion of the counteracting flange support portion 137, such as gravity or forces owing to a partial vacuum applied to the pre-form.

In addition, it will be appreciated that the path length around the transition region of the pre-form 200 is longest for the base-ply set, and reduces for upper layers in the upper-ply set, owing to the curvature of the transition region. The opposite is true for the portion of the pre-form extending around the edge of the flange-forming portion 106 between the underside surface 122 and the lay-up surface 120. In order to avoid bunching of plies at these locations, it is therefore beneficial for the layers to slide relative one another, which is aided by applying tension to the pre-form.

The tension force in the pre-form 200 is proportional to the area of the second and third regions of the pre-form 208, 210 that slides relative to a surface of the tool. Accordingly, providing a pre-form having a third region 210 that extends significantly beyond the second region 208 and slides with the second region 208 during forming has a beneficial effect on forming the flange.

As shown in FIG. 5, with the flange-forming portions 106 in the forming configuration at the end of the forming operation, the second region 208 of the pre-form extends marginally beyond the edge joining the lay-up surface 120 and underside surface 122 of the flange-forming portion 106, and the third region 210 of the pre-form extends along the lay-up surface 120 of the flange-forming portion 106.

Once the flange forming operation is complete (FIG. 5), the controller initiates a curing operation and causes the heating apparatus to heat the pre-form 200, including the formed flange, to at least a threshold curing temperature, which in this embodiment is 135° C. The controller also controls the vacuum source so that an unbalanced pressure force is applied to the pre-form through the vacuum bag.

After a curing period of 6 hours, the controller turns off the heaters and the cured casing 14 is allowed to cool on the tool 102. The flange support structure 136 is removed from the tool 102 and the vacuum bag and associated equipment is removed from the cured component. The flange-forming portions 106 are retracted to the lay-up configuration, and the cured casing 14 is removed from the tool.

The casing 14 is then trimmed to remove the third region of the pre-form 210 and optionally any undesired portion of the second region of the pre-form 208. In this embodiment, the portion of the second region of the pre-form that extends onto the lay-up surface 120 of the flange-forming portion is removed.

As the third region of the pre-form 210 is discarded after the forming operation, embodiments of the invention in which the third region comprises a reduced thickness and/or fewer layers than the second region of the pre-form result in a corresponding reduction in the amount of composite material consumed, whilst still achieving the objective of increased tension in the pre-form 200 during forming.

Although embodiments of the invention have been described with respect to the manufacture of a casing for a gas turbine, it will be appreciated that the invention is equally applicable to any structure having a flange or other portion diverting from a main body portion at one edge of the component, and which is formed by sliding relative to a movable portion of a tool during a forming operation. In particular, the invention is applicable to both annular and non-annular structures.

One example of a non-annular structure is a curved spar for a wing. Spars for wings generally comprise a central main body and two side flanges.

It will be appreciated that references to the thickness of a region of a pre-form may relate to an average thickness over the region of the pre-form. For example, where the thickness of a region of a pre-form varies along its length, the expression "thickness" should be considered to define the average thickness over the respective region.

It will be appreciated that either one of the main body portion and the flange-forming may move relative to a support structure during a forming operation. For example, a main body portion and counteracting flange support structure may be actuated to move relative to a flange-forming portion, and a pre-form may consequently be drawn over the flange-forming portion.

Although an embodiment of the invention has been described with reference to Automatic Tape Laying (ATL), it will be appreciated that other lay-up procedures may be used, such as Automatic Fibre Placement (AFP), automatic filament winding, and manual lay-up.

The invention claimed is:

1. A method of manufacturing a composite component comprising a main body and an integral flange, the method comprising:
    applying fibre reinforcement material on a tool having a main body portion and a flange-forming portion to provide a pre-form having first, second and third contiguous regions, the first region corresponding to the main body of the component and the second region corresponding to the integral flange of the component, wherein the thickness of the third region of the pre-form is less than the thickness of the second region of the pre-form; and
    causing relative movement between the flange-forming portion and the main body portion so that the second region of the pre-form deforms to form the flange, wherein the relative movement of the flange-forming portion and the main body portion causes sliding movement between (i) the second region and the flange-forming portion and (ii) between the third region and the flange-forming portion, thereby producing a tension force in at least the second region of the pre-form during forming of the flange; and
    removing the third region of the pre-form.

2. A method according to claim 1, further comprising separating a part of the composite material formed on the tool after the forming operation including material corresponding to the third region of the pre-form.

3. A method according to claim 1, wherein the third region of the pre-form comprises fewer layers of fibre reinforcement material than the second region of the pre-form.

4. A method according to claim 1, wherein the thickness of the third region of the pre-form is 50% or less of the thickness of the second region of the pre-form.

5. A method according to claim 1, wherein the fibre reinforcement material is applied on the tool so that the thickness of the second region of the preform is substantially constant, and so that the thickness of the third region of the pre-form is substantially constant.

6. A method according to claim 1, wherein the preform comprises a base-ply set of fibre reinforcement material extending through at least the second and third regions of the pre-form, and an upper-ply set extending through at least the second region but not the third region of the pre-form.

7. A method according to claim 6, wherein the base-ply set comprises at least one layer of fibre reinforcement material, and wherein the upper-ply set comprises a plurality of layers of fibre-reinforcement material.

8. A method according to claim 1, further comprising inhibiting sliding movement between the first region of the pre-form and the main body portion of the tool.

9. A method according to claim 1, wherein the fibre reinforcement material is applied on the tool so that the third region of the pre-form has an area of at least 25% of the area of the second region of the pre-form.

10. A method according to claim 1, wherein the fibre reinforcement material is applied so that the first, second and third regions are contiguous along a generally longitudinal direction, and wherein the third region of the pre-form has a longitudinal extent of at least 25% of the longitudinal extent of the second region of the pre-form.

11. A method according to claim 1, wherein the flange-forming portion of the tool has a lay-up surface that is substantially continuous with a lay-up surface of the main body portion of the tool in a lay-up configuration of the tool, and a side surface which extends between the lay-up surfaces of the flange-forming portion and main body portion of the tool in a forming configuration of the tool.

12. A method according to claim 1, wherein the direction of relative movement of the flange-forming portion and main body portion of the tool is parallel to the extent of the flange.

13. A method according to claim 1, wherein the composite component is an annular or a partially annular component, such as a casing for a gas turbine engine, wherein the main body portion and the flange-forming portions of the tool are configured for relative radial movement, and wherein the flange is a radial flange.

* * * * *